(12) United States Patent
Wu et al.

(10) Patent No.: US 7,985,933 B2
(45) Date of Patent: Jul. 26, 2011

(54) ASSEMBLING STRUCTURE OF A QUICK INSTALLATION/UNINSTALLATION SWITCH

(75) Inventors: Chih-Yuan Wu, Xinzhuang (TW); Chih-Kun Hsiao, Xinzhuang (TW); Jyh-Ming Lee, Xinzhuang (TW)

(73) Assignee: Switchlab Inc., Taipei County (TW)

( * ) Notice: Subject to any disclaimer, the term of this patent is extended or adjusted under 35 U.S.C. 154(b) by 386 days.

(21) Appl. No.: 12/318,172

(22) Filed: Dec. 23, 2008

(65) Prior Publication Data
US 2009/0194396 A1    Aug. 6, 2009

(30) Foreign Application Priority Data
Feb. 4, 2008    (TW) ................................ 97202449 U (51) Int. Cl.
*H01H 27/06* (2006.01)

(52) U.S. Cl. ..................................................... 200/43.08

(58) Field of Classification Search ............... 200/43.01, 200/43.04, 43.08, 43.11, 11 R, 11 A, 11 G, 200/11 H, 16 R–16 D, 50.09, 329, 330, 334, 200/564, 568, 569, 572, 336
See application file for complete search history.

(56) References Cited

U.S. PATENT DOCUMENTS

| | | | | |
|---|---|---|---|---|
| 5,252,791 A | * | 10/1993 | Williams | 200/11 C |
| 5,756,947 A | * | 5/1998 | Trimble et al. | 200/11 C |
| 5,833,049 A | * | 11/1998 | Yamashita et al. | 200/284 |
| 7,196,278 B2 | * | 3/2007 | Kurek et al. | 200/43.08 |
| 7,351,924 B2 | * | 4/2008 | Scherl et al. | 200/43.08 |

* cited by examiner

*Primary Examiner* — Edwin A. Leon (74) *Attorney, Agent, or Firm* — Rosenburg, Klein & Lee (57) ABSTRACT

An assembling structure of a quick installation/uninstallation switch, including a layout fixing seat formed with a central opening and a transverse insertion slot intersecting the central opening. A locating member is inserted through the transverse insertion slot. The locating member is formed with a central hole corresponding to the central opening. A resilient locating member and at least one lateral projecting section with a guide slope are disposed on the circumference of the central hole. At least one resilient restoring member is disposed between the locating member and the layout fixing seat for restoring the locating member to its home position. A connecting end of a switch main body is fitted in the central opening. A lateral locating section with a guide slope is formed on a circumference of the connecting end corresponding to the lateral projecting section. A locating transverse slot is formed on the circumference of the connecting end. The resilient locating member is inlaid in the locating transverse slot.

10 Claims, 10 Drawing Sheets

ASSEMBLING STRUCTURE OF A QUICK INSTALLATION/UNINSTALLATION SWITCH

BACKGROUND OF THE INVENTION

The present invention is related to an assembling structure of a quick installation/uninstallation switch, and more particularly to a switch structure, which can be easily assembled/disassembled and firmly located.

A conventional switch module installed on the panel of a switch box generally has a switch main body and a retaining collar. The retaining collar is screwed with the switch main body to fixedly clamp the circumference of a hole formed on the panel. The switch main body is also connected with a layout fixing seat arranged in the switch box for connecting with the wire-connecting terminal modules of the respective layout circuits. An operator can operate the switch main body outside the switch box to control making/breaking of the layout circuits.

There are various configurations of assemblies of conventional layout fixing seats and switch modules. For example, Taiwanese Patent Publication No. 487214 discloses a convenient installation/uninstallation switch module including a pushbutton switch and a fixing seat. The pushbutton switch includes a cylindrical main body and a pushbutton disposed on the main body. A middle section of the main body is formed with a threaded section on which a threaded collar is screwed. An outer circumference of an end of the main body is formed with a set of engaging blocks and a set of locating blocks opposite to each other. Each engaging block has a bottom end formed with an inward inclined slope. The fixing seat is a rectangular box having a front wall. The front wall is formed with a circular hole. Two sets of notches and locating dents are disposed on the circumference of the circular hole corresponding to the engaging blocks and the locating blocks of the main body respectively. The fixing seat has a rear open end formed with a reverse U-shaped partitioning board positioned above the circular hole. A reverse U-shaped engaging member is bridged over the partitioning board. Two springs are disposed between the engaging member and the partitioning board. Lower ends of two arms of the engaging member are formed with beveled blocks corresponding to the notches of the circumference of the circular hole. A projecting section is formed on outer side of middle section of the engaging member. An oblique groove is formed on the projecting section.

When assembled, the main body of the pushbutton switch is fitted into the circular hole of the fixing seat. At this time, the locating blocks are guided by the locating dents and the engaging blocks are moved into the notches. The inward inclined slopes of the engaging blocks push the beveled blocks of the engaging member to transversely compress the springs. Accordingly, the engaging blocks can, pass through the beveled blocks. Thereafter, the engaging blocks abut against the beveled blocks and are located. When disassembled, an operator can use a tool to pass through a hole of the fixing seat to abut against the oblique groove of the engaging member. Alternatively, the operator can directly manually press the edge of the projecting section of the engaging member in reverse direction. (This operation is harder to perform.) Accordingly, the engaging member can be driven to move the beveled blocks to a position beside the engaging blocks of the pushbutton switch. Under such circumstance, the pushbutton switch can be easily detached from the fixing seat in reverse direction. However, in practice, such structure has some defects as follows:

1. Only one side of the engaging member with the projecting blocks can be operated in single direction. This makes it quite inconvenient to use the switch module.
2. The bottom of the fixing seat is covered with an additional cover board to keep the engaging member connected with the fixing seat. The cover board has two wing plates, which are resiliently latched with outer side of the fixing seat. The wing plates are very likely to loosen or detach from the fixing seat due to external force.
3. When the pushbutton switch is fixedly connected with the fixing seat, that is, the beveled blocks of the engaging member are engaged with the engaging blocks of the pushbutton switch, the locating blocks are separated from the bottoms of the locating dents. Therefore, the pushbutton switch is kept connected with the fixing seat simply by means of engagement between the engaging blocks and the beveled blocks of the engaging member. As a result, the pushbutton switch tends to shake or even rotate. This affects assembling and operation quality.

SUMMARY OF THE INVENTION

It is therefore a primary object of the present invention to provide an assembling structure of a quick installation/uninstallation switch, which can be easily assembled/disassembled and conveniently used.

It is a further object of the present invention to provide the above assembling structure of the quick installation/uninstallation switch, which can be firmly assembled and located with better assembling quality.

According to the above objects, the assembling structure of the quick installation/uninstallation switch of the present invention includes: a layout fixing seat having a top wall formed with a central opening vertically passing through the top wall, multiple wire-connecting terminal modules being disposed at a bottom end of the central opening for connecting with wires, a middle section of the layout fixing seat being formed with a transverse insertion slot, which passes through the layout fixing seat from one side to the other side thereof and intersects the central opening; a locating member inserted through the transverse insertion slot of the layout fixing seat, a first end and a second end of the locating member outward protruding from two ends of the transverse insertion slot, whereby the locating member can be pushed and shifted from outer side of the layout fixing seat in different directions, the locating member being formed with a central hole corresponding to the central opening, at least one lateral projecting section being formed on a lateral side of a circumference of the central hole, in natural position, the lateral projecting section extending into the central opening, at least one resilient restoring member being disposed between the locating member and the layout fixing seat for resiliently restoring the locating member to the natural position; and a switch main body formed with a central axial receiving space in which a controlling member is fitted, the switch main body having a first end as a connecting end fitted in the central opening of the layout fixing seat, a lateral locating section being formed on a circumference of the connecting end corresponding to the lateral projecting section of the locating member, the lateral locating section being positioned between the locating member and the layout fixing seat in cooperation with the resilient restoring member, whereby when the locating member is positioned in the natural position, the lateral locating section of the switch main body is stopped by the lateral projecting section and located and the controlling member can abut against and drive the wire-connecting terminal modules, when the locating member is transversely pushed or pulled, the lateral projecting section releasing the lateral locating section.

In the above assembling structure of the quick installation/uninstallation switch, at least one axially extending guide channel is formed on a circumference of the connecting end of the switch main body. At least one guide projection is formed on a circumference of the central opening of the layout fixing seat corresponding to the guide channel. The guide projection can slide into and along the guide channel to guide the connecting end into the central opening.

In the above assembling structure of the quick installation/uninstallation switch, a circumference of an end section of the connecting end of the switch main body is formed with at least one locating recess and at least one locating projection is formed on the circumference of the central opening of the layout fixing seat in alignment with the locating recess. The locating projection is inserted in the locating recess to locate the connecting end in the central opening.

The present invention can be best understood through the following description and accompanying drawings wherein:

DETAILED DESCRIPTION OF THE PREFERRED EMBODIMENTS

Figure 1:
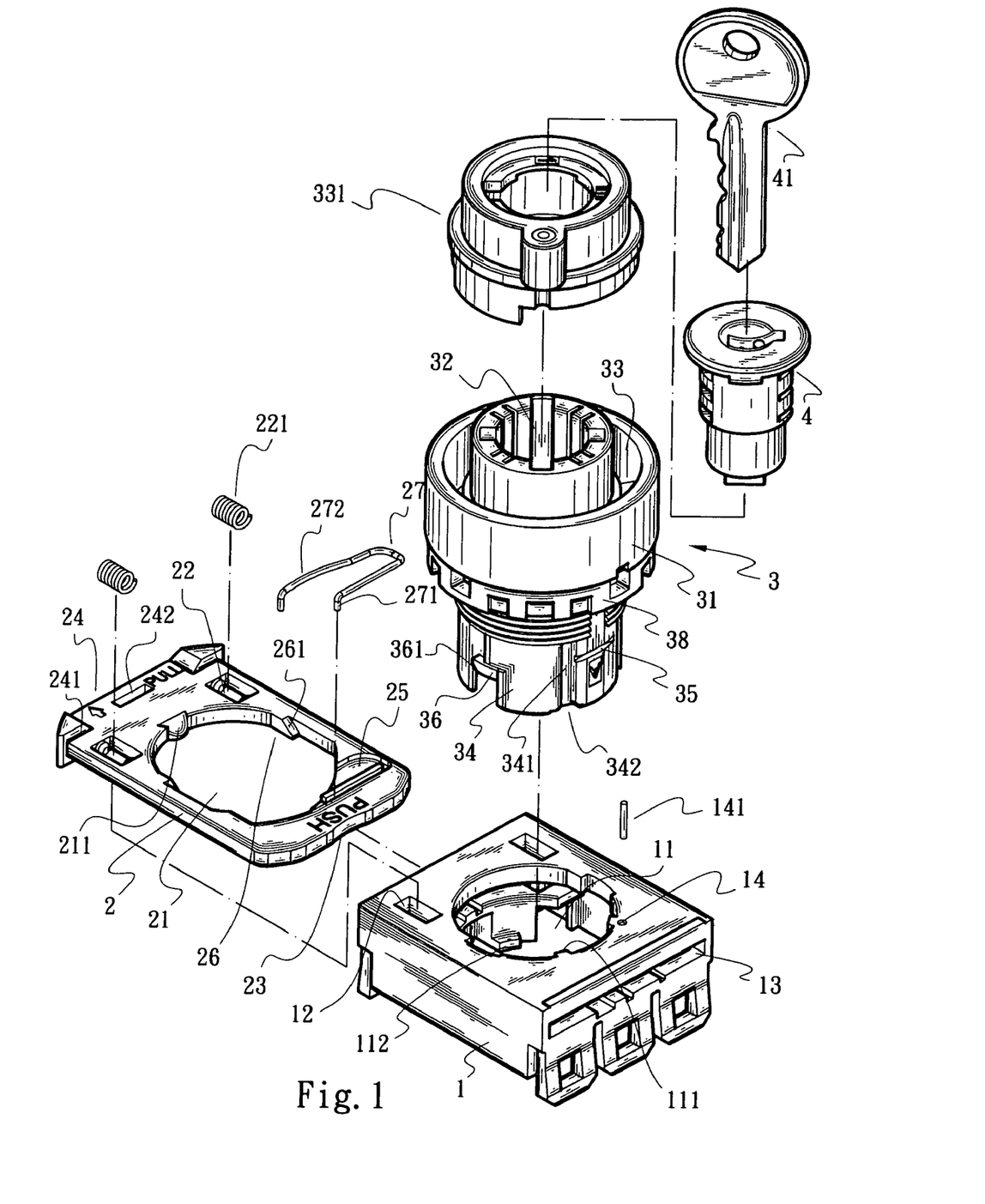
FIG. 1 is a front perspective exploded view of the present invention.
Figure 2:
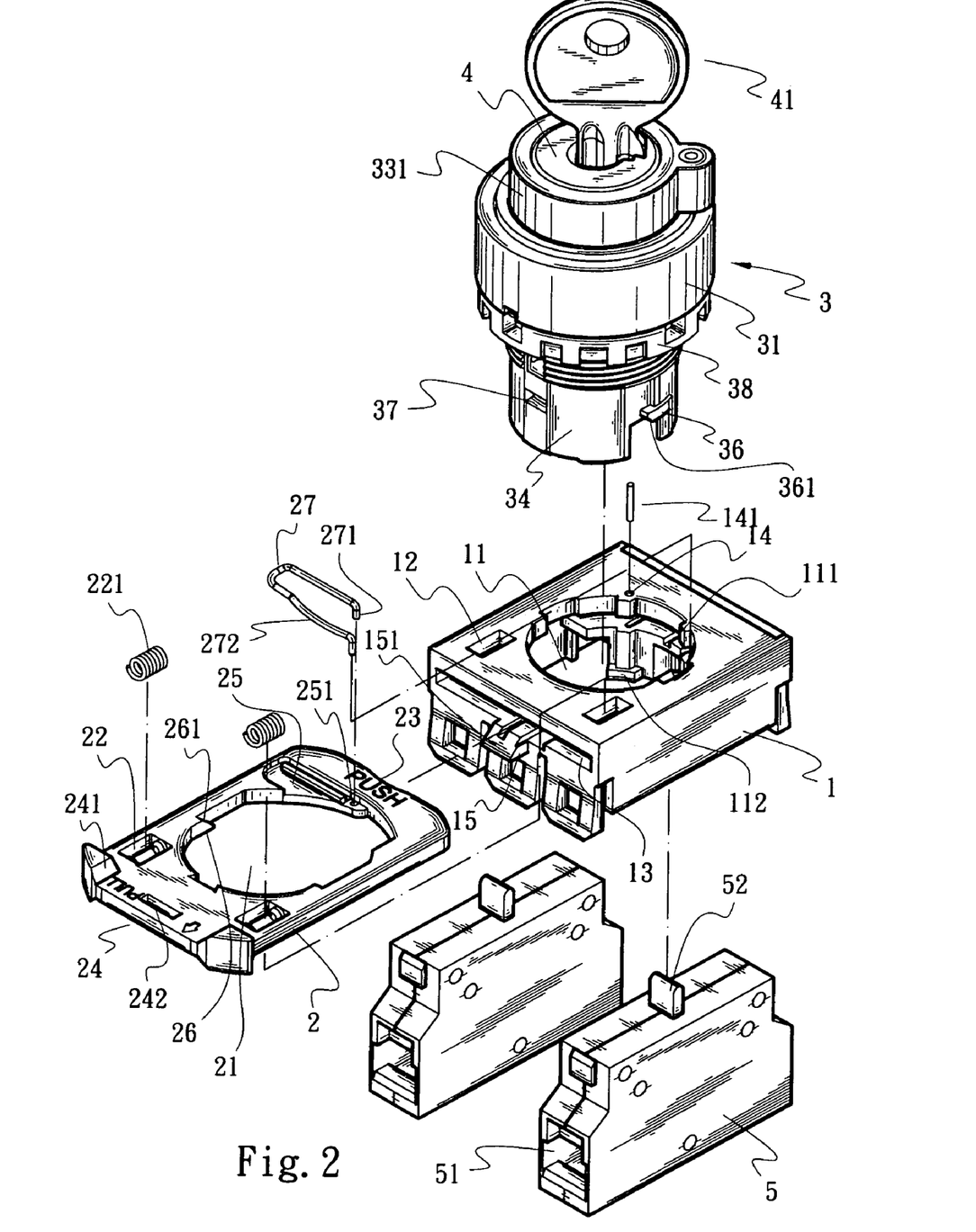
FIG. 2 is a rear perspective partially exploded view of the present invention.
Figure 3:
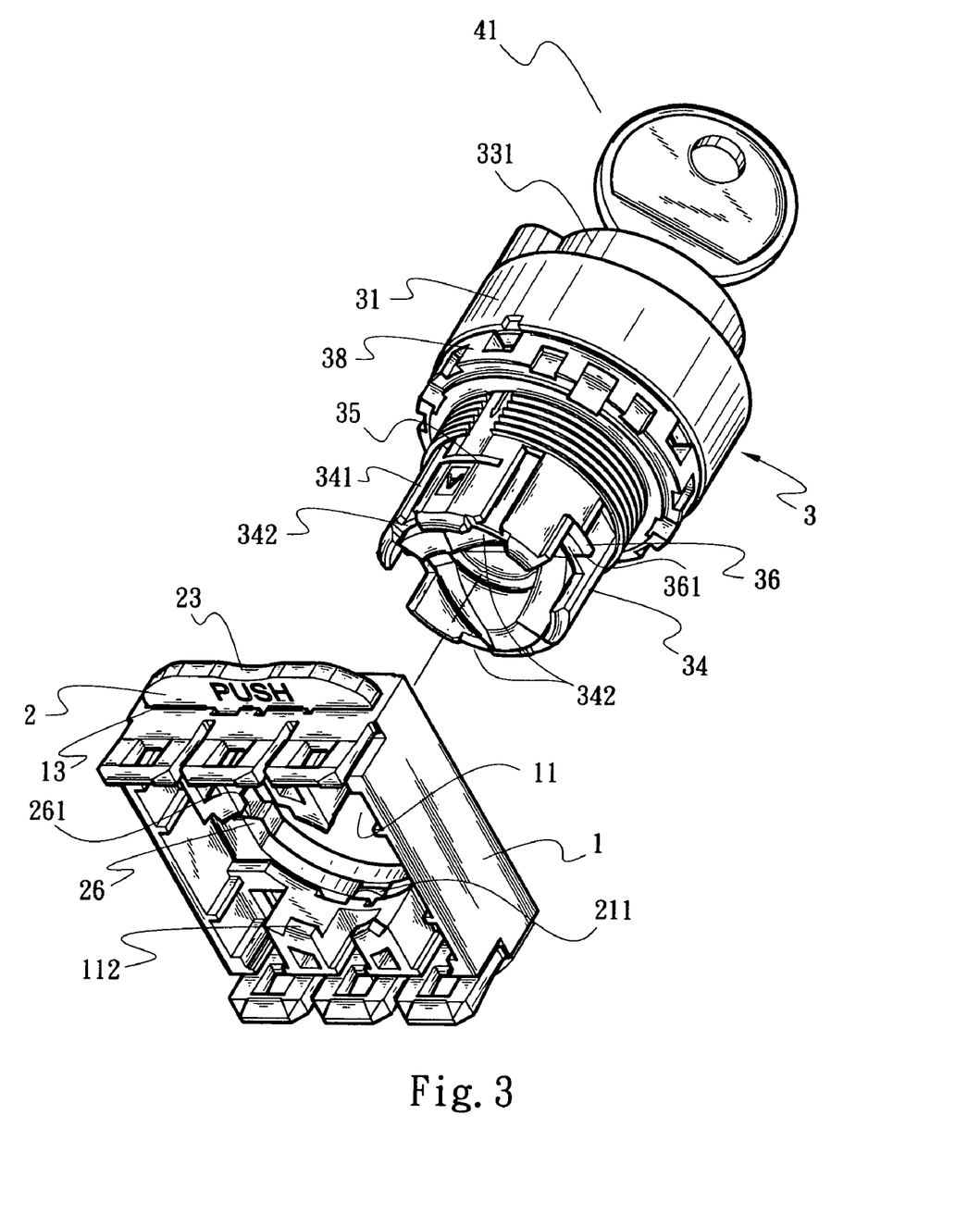
FIG. 3 is a bottom perspective partially exploded view of the present invention.
Figure 4:
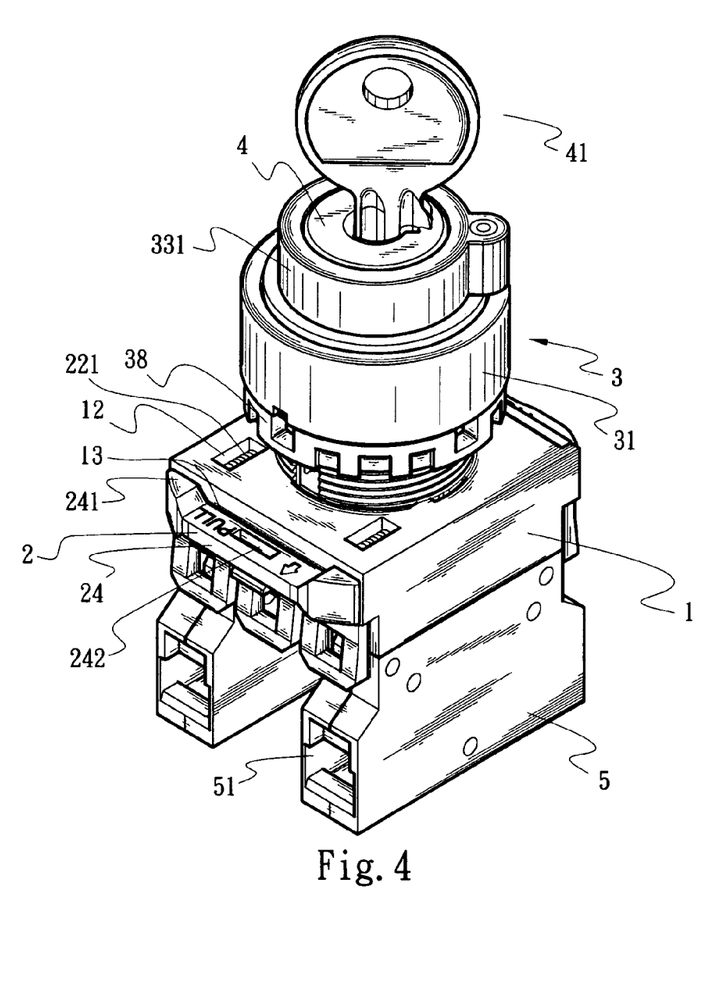
FIG. 4 is a front perspective assembled view of the present invention.
Figure 5:
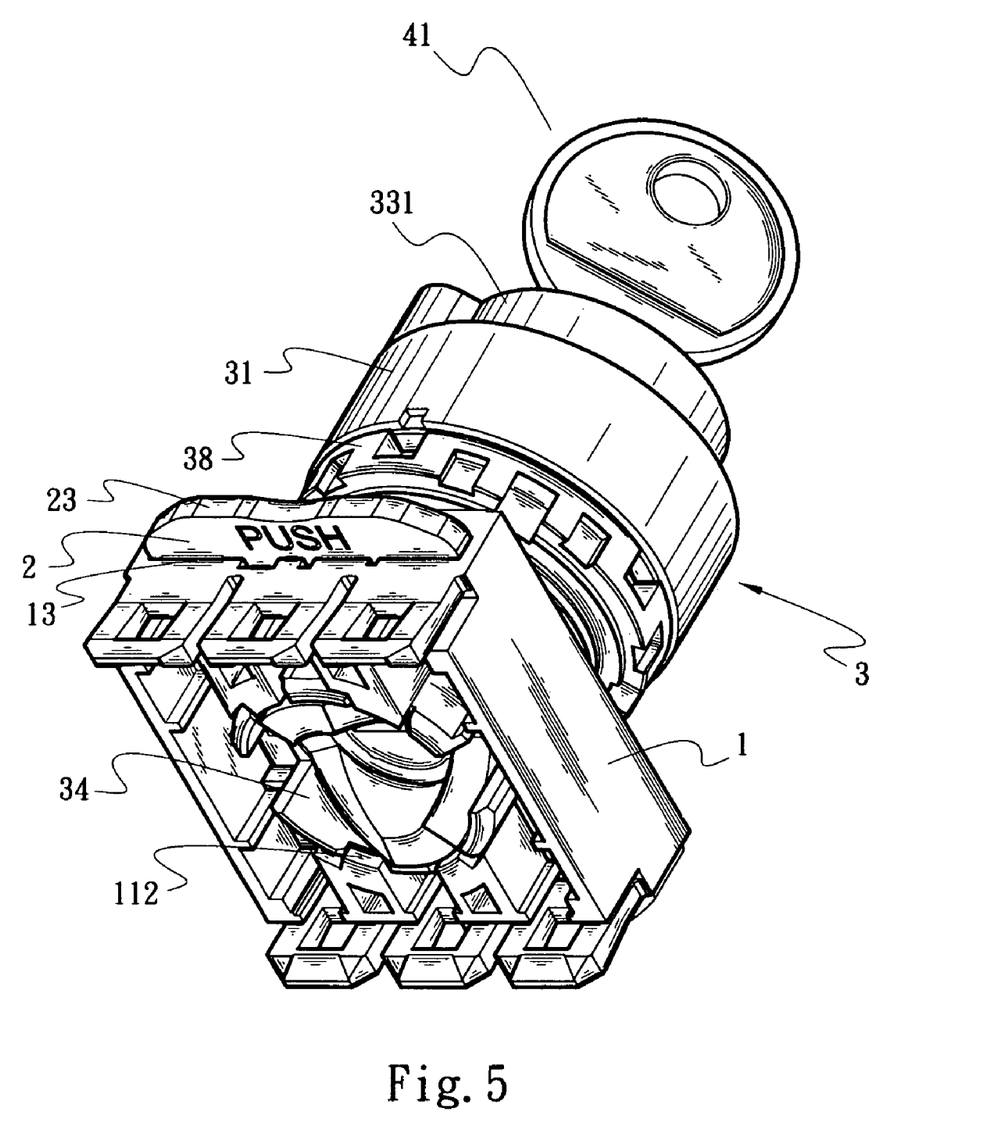
FIG. 5 is a bottom perspective assembled view of the present invention.
Figure 6:
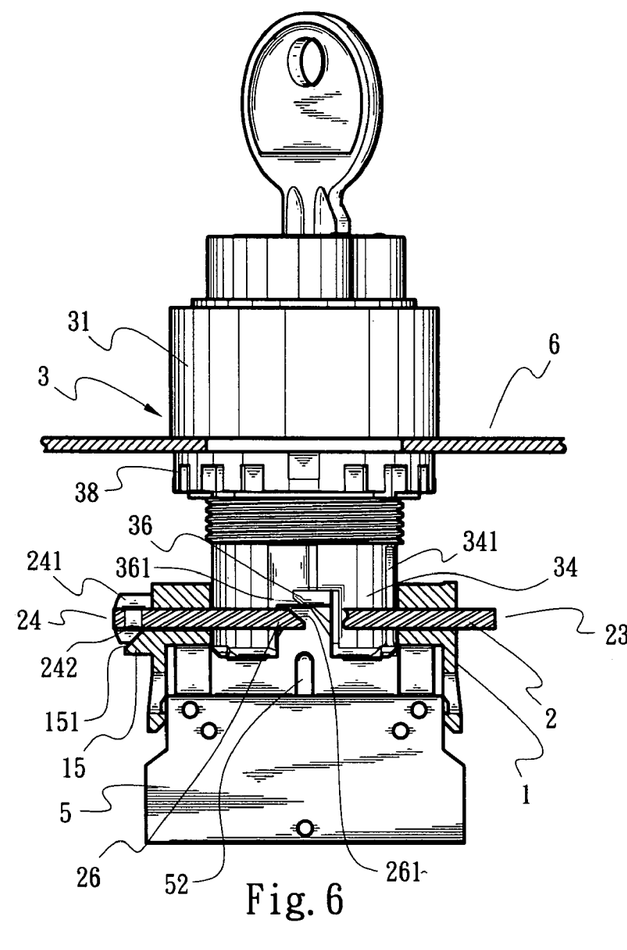
FIG. 6 is a side sectional view of the present invention, showing the assembling operation thereof in one state.
Figure 7:
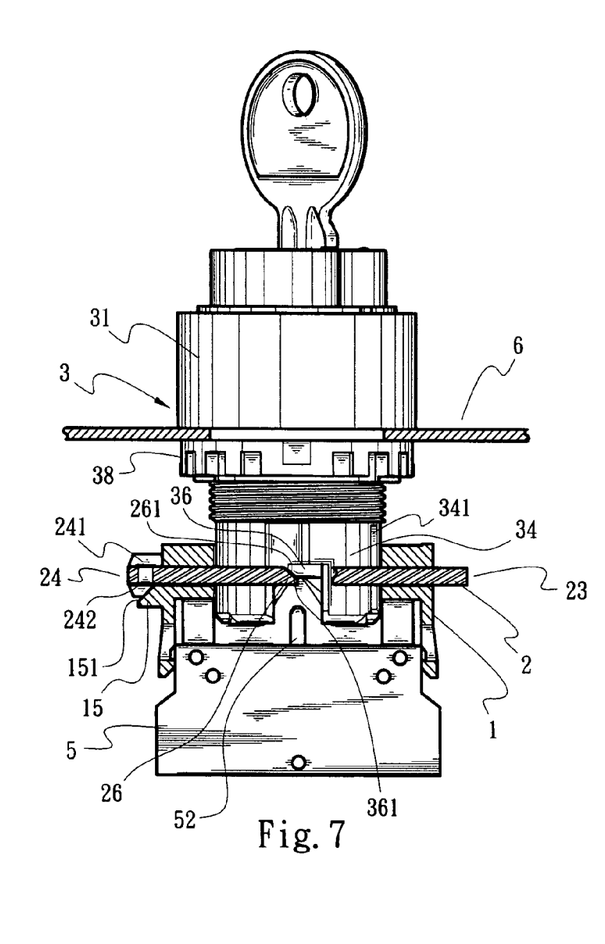
FIG. 7 is a side sectional view of the present invention, showing the assembling operation thereof in another state.
Figure 8:
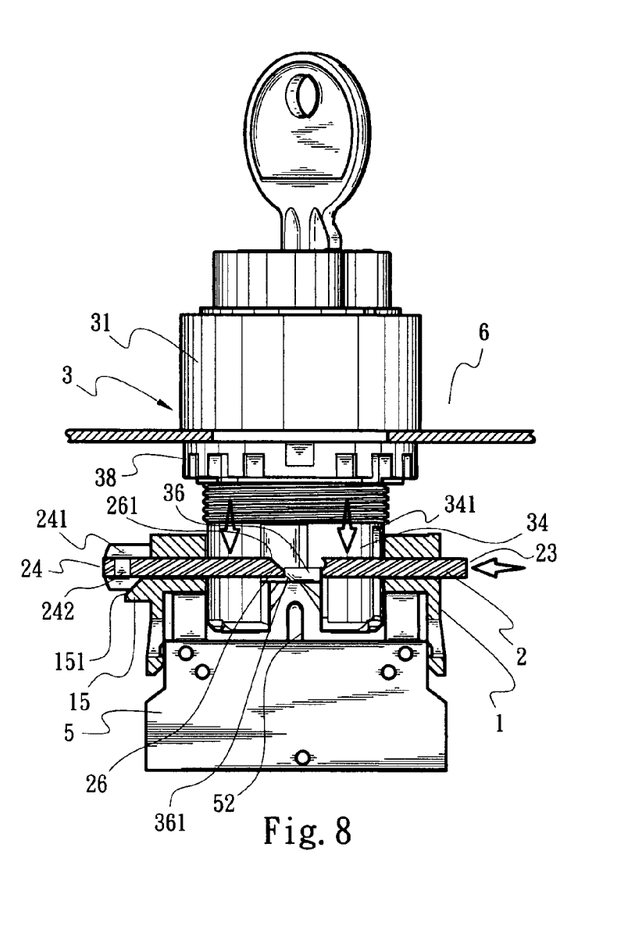
FIG. 8 is a side sectional view of the present invention, showing the assembling operation thereof in still another state.
Figure 9:
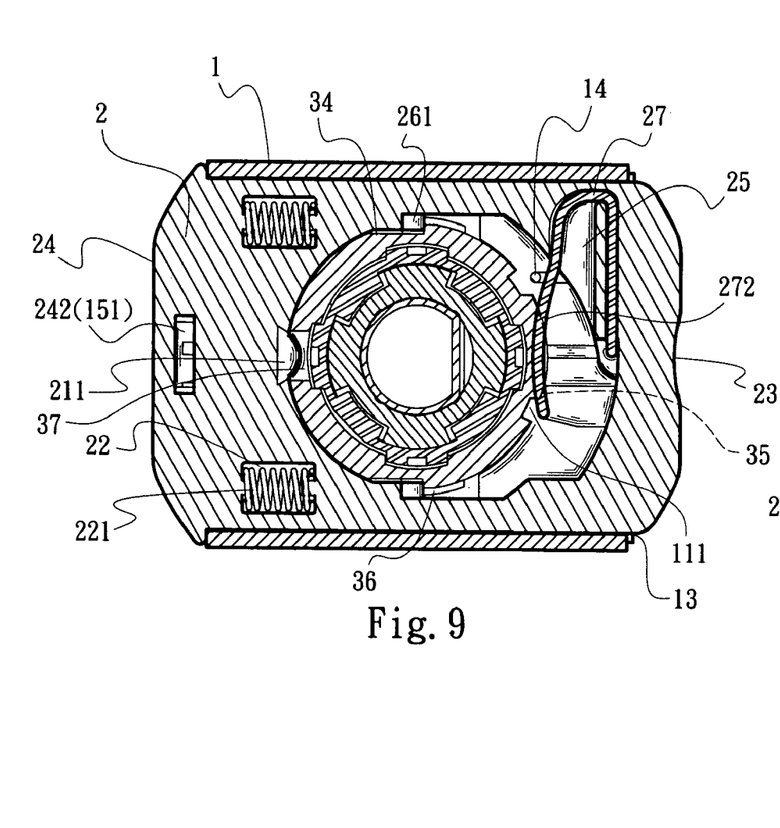
FIG. 9 is a sectional view of the present invention, showing that the resilient locating member is inlaid into the locating transverse slot when assembled.
Figure 10:
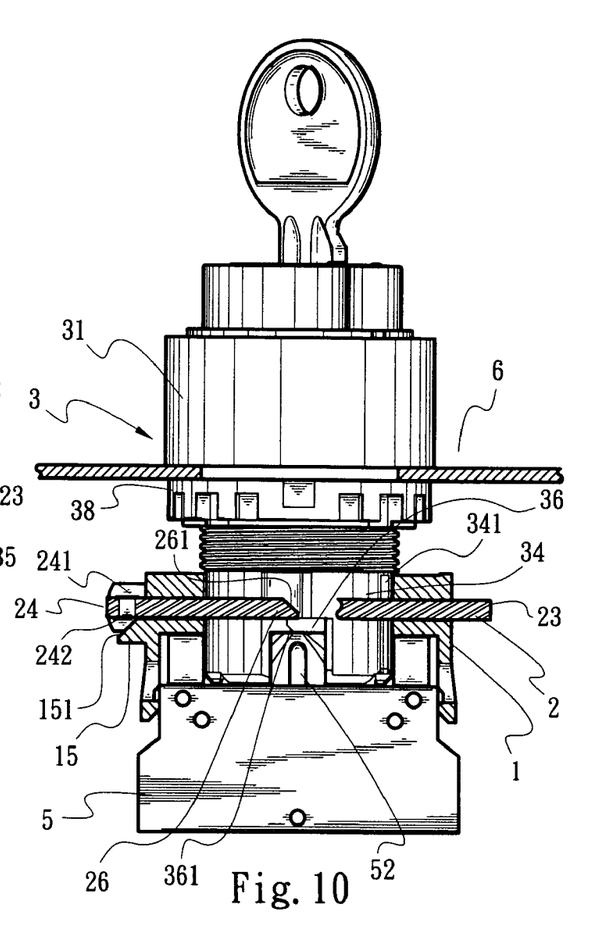
FIG. 10 is a side sectional view of the present invention, showing the disassembling operation thereof in one state.
Figure 11:
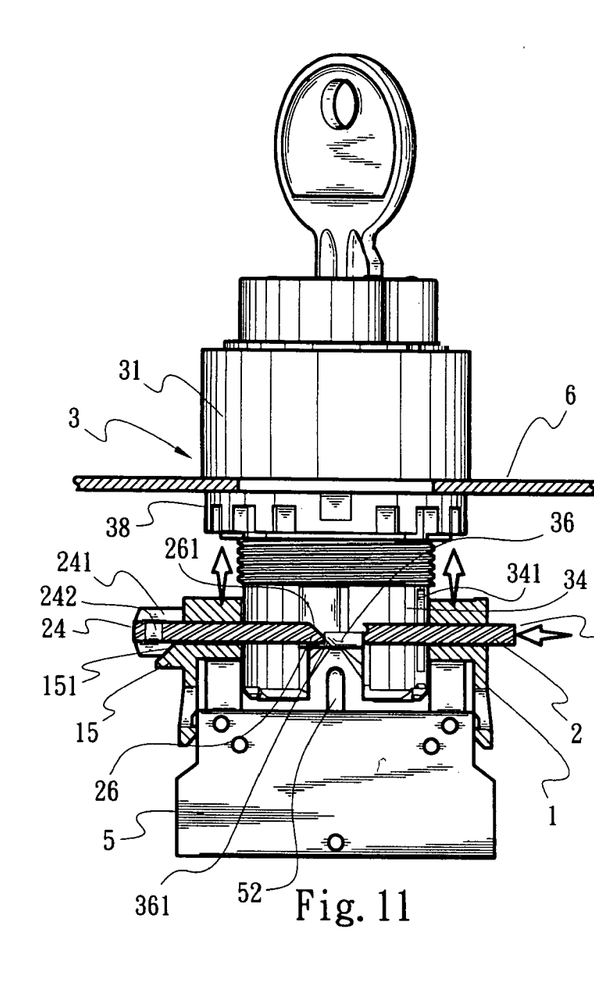
FIG. 11 is a side sectional view of the present invention, showing the disassembling operation thereof in another state.
Figure 12:
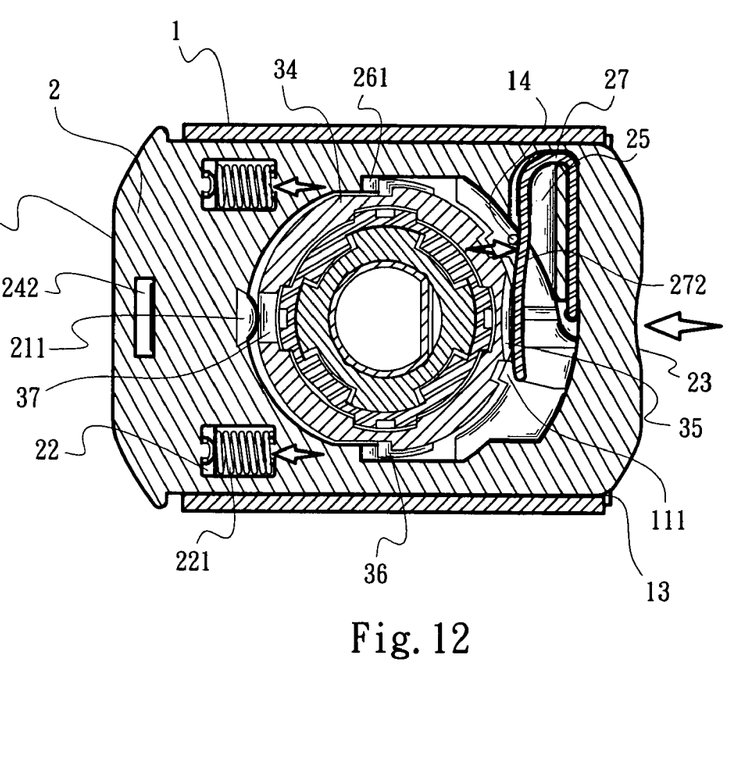
FIG. 12 is a sectional view of the present invention, showing that the resilient locating member is moved out of the locating transverse slot when disassembled.
Figure 13:
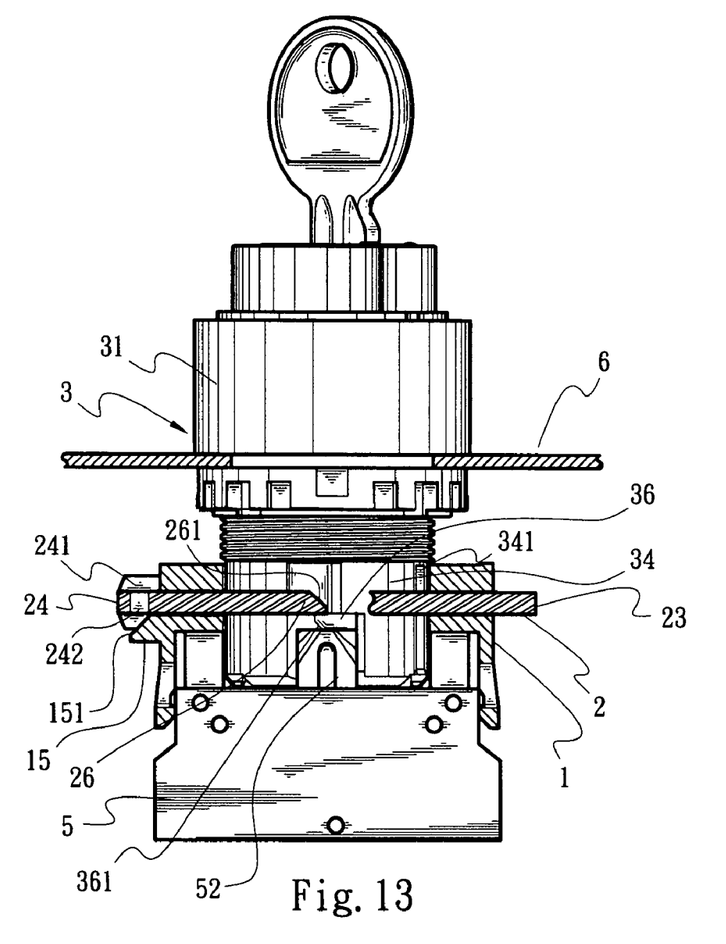
FIG. 13 is a side sectional view of the present invention, showing the disassembling operation thereof in still another state.

Please refer to FIGS. 1 and 2. The present invention includes a layout fixing seat 1, a locating member 2 and a switch main body 3. The layout fixing seat 1 has a top wall formed with a central opening 11 vertically passing through the top wall. Multiple guide projections 111 are formed on a circumference of the central opening 11. Multiple locating projections 112 are formed under the circumference of the central opening 11 in alignment with the guide projections 111 or not in alignment therewith. The layout fixing seat 1 is further formed with two lateral openings 12 on two lateral sides of one side of the central opening 11 respectively. In addition, a downward extending pinhole 14 is formed on the other side of the central opening 11 for accommodating a pin 141. The layout fixing seat 1 is further formed with a transverse insertion slot 13, which passes through the layout fixing seat 1 from one side to the other side thereof and intersects the central opening 11. A projecting section 15 is formed under one end of the transverse insertion slot 13. An upper side of a free end of the projecting section 15 is formed with a guide slope 151. The locating member 2 is inserted through the transverse insertion slot 13 of the layout fixing seat 1. A first end and a second end of the locating member 2 outward protrude from two ends of the transverse insertion slot 13 to form a first edge 23 and a second edge 24. An insertion hole 242 is formed at a center of the second edge 24, which is proximal to the projecting section 15. Two outward protruding stopper blocks 241 are formed on two sides of the insertion hole 242. Two sides of the end of the transverse insertion slot 13 can stop the stopper blocks 241 to prevent the locating member 2 from being over-inserted. The locating member 2 is formed with a central hole 251 corresponding to the central opening 11. A lateral recessed section 25 is formed on one side of a circumference of the central hole 251 corresponding to the pinhole 14. A dent 251 is formed in the lateral recessed section 25. A hook section 271 of a first end of a U-shaped resilient locating member 27 is inlaid in the dent 251. A second end of the resilient locating member 27 is formed with a resilient arm 272. The resilient arm 272 leans against the pin 141 and extends into the central hole 21. A protruding insertion section 211 is formed on another side of the circumference of the central hole 21. In addition, two lateral projecting sections 26 are formed on two lateral sides of the circumference of the central hole between the lateral recessed section 25 and the protruding insertion section 211. The lateral projecting sections 26 extend in a direction of the transverse insertion slot 13. Each lateral projecting section 26 has a free end. An upper side of the free end is formed with a downward inclined guide slope 261. The locating member 2 is, further formed with two lateral holes 22 on two sides of the central hole 21 in alignment with the lateral openings 12 of the layout fixing seat 1 respectively. Two resilient restoring members 221 (such as coiled springs) are respectively positioned in the lateral holes 22 to abut against the walls of the lateral openings 12. After the locating member 2 is forcedly shifted, the resilient restoring members 221 serve to resiliently restore the locating member 2 to its home position. A middle section of the switch main body 3 is formed with an annular flange 31. The switch main 3 is further formed with an outer thread adjacent to the annular flange 31 and proximal to a first end of the switch main body 3. A fixing collar 38 can be screwed on the outer thread for fixedly clamping a circumference of a hole formed on a panel 6. The switch main body 3 is formed with a central axial receiving space 32 in which a controlling member is fitted. The controlling member can be a lock core 4 as shown in FIG. 1 or a pushbutton switch. An annular groove 33 is formed on a face of a second end of the switch main body 3. An outer retaining collar 331 is accommodated in the annular groove 33 for holding the controlling member. The first end of the switch main body 3 serves as a connecting end 34. Multiple guide channels 341 are formed on a circumference of the connecting end 34 corresponding to the guide projections 111 respectively. In addition, two lateral locating sections 36 are formed on the circumference of the connecting end 34 corresponding to the lateral projecting sections 26 respectively. Each guide channel 341 has an open end formed with an inward tapered locating recess 342. Each lateral locating section 36 has an end having a bottom side. The bottom side is formed with an upward inclined guide slope 361. In addition, a locating transverse slot 35 is formed on a middle section of one side of the connecting end 34 corresponding to the resilient locating member 27. An insertion dent 37 is formed on a middle section of another side of the connecting end 34 corresponding to the protruding insertion section 211.

In actual application, at least one wire-connecting terminal module 5 is connected under the layout fixing seat 1. A top of the wire-connecting terminal module 5 has a push control key 52 extending into a bottom end of the central opening 11. In addition, two wire sockets 51 are symmetrically disposed on two sides of the wire-connecting terminal module 5 for inserting therein end sections of relevant wires. When assembled, the connecting end 34 of the switch main body 3 is fitted into the central opening 11 of the layout fixing seat 1. The guide projections 111 extend into the guide channels 341 to guide the connecting end 34. When the lateral locating sections 36 move into the central opening 11 along with the connecting end 34 to touch the lateral projecting sections 26, the guide slopes 361 and the guide slopes 261 guide each other to drive and move the locating member 2 transversely. At this time, the resilient restoring members 221 are compressed, permitting the lateral locating sections 36 to pass through the lateral projecting sections 26. Then, the resilient restoring members 221 resiliently push the locating member 2 back to its home position where the lateral projecting sections 26 abut against upper sides of the lateral locating sections 36. When the connecting end 34 is located in the central opening 11, the face of the connecting end 34 is close to the push control key 52 of the wire-connecting terminal module 5 for controlling the operation of the wire-connecting terminal module 5. At this time, the locating recesses 342 are right fitted with the locating projections 112 and the protruding insertion sections 211 are inserted in the insertion dents 37. Also, the resilient arm 272 of the resilient locating member 27 is resiliently inlaid in the locating transverse slot 35. Accordingly, the switch main body 3 and the layout fixing seat 1 are firmly connected by means of multiple fixing structures.

When detached, an operator can manually press the first edge 23 of the locating member 2. Alternatively, the operator can use a sharp tool to extend into the socket 242 and abut against the guide slope 151 of the projecting section 15 to pry the locating member 2. At this time, the lateral projecting sections 26 of the locating member 2 are slid in reverse direction to release the lateral locating sections 36. Under such circumstance, the operator can easily separate the switch main body 3 from the layout fixing seat 1.

In conclusion, by means of the assembling structure of the quick installation/uninstallation switch of the present invention, the switch main body and the layout fixing seat can be firmly connected and easily assembled/disassembled.

The above embodiments are only used to illustrate the present invention, not intended to limit the scope thereof. Many modifications of the above embodiments can be made without departing from the spirit of the present invention.

What is claimed is:

1. An assembling structure of a quick installation/uninstallation switch, comprising:
a layout fixing seat having a top wall formed with a central opening vertically passing through the top wall, multiple wire-connecting terminal modules being disposed at a bottom end of the central opening for connecting with wires, a middle section of the layout fixing seat being formed with a transverse insertion slot, which passes through the layout fixing seat from one side to the other side thereof and intersects the central opening;
a locating member inserted through the transverse insertion slot of the layout fixing seat, a first end and a second end of the locating member outward protruding from two ends of the transverse insertion slot, whereby the locating member can be pushed and shifted from outer side of the layout fixing seat in different directions, the locating member being formed with a central hole corresponding to the central opening, at least one lateral projecting section being formed on a lateral side of a circumference of the central hole, in natural position, the lateral projecting section extending into the central opening, at least one resilient restoring member being disposed between the locating member and the layout fixing seat for resiliently restoring the locating member to the natural position; and a switch main body formed with a central axial receiving space in which a controlling member is fitted, the switch main body having a first end as a connecting end fitted in the central opening of the layout fixing seat, a lateral locating section being formed on a circumference of the connecting end corresponding to the lateral projecting section of the locating member, the lateral locating section being positioned between the locating member and the layout fixing seat in cooperation with the resilient restoring member, whereby when the locating member is positioned in the natural position, the lateral locating section of the switch main body is stopped by the lateral projecting section and located and the controlling member can abut against and drive the wire-connecting terminal modules, when the locating member is transversely pushed or pulled, the lateral projecting section releasing the lateral locating section.

2. The assembling structure of the quick installation/uninstallation switch as claimed in claim 1, wherein at least one axially extending guide channel is formed on a circumference of the connecting end of the switch main body, at least one guide projection being formed on a circumference of the central opening of the layout fixing seat corresponding to the guide channel, whereby the guide projection can slide into and along the guide channel to guide the connecting end into the central opening.

3. The assembling structure of the quick installation/uninstallation switch as claimed in claim 1 or 2, wherein a circumference of an end section of the connecting end of the switch main body is formed with at least one locating recess and at least one locating projection is formed on the circumference of the central opening of the layout fixing seat in alignment with the locating recess, whereby the locating projection is inserted in the locating recess to locate the connecting end in the central opening.

4. The assembling structure of the quick installation/uninstallation switch as claimed in claim 1 or 2, wherein a resilient locating member is disposed on the circumference of the central hole of the locating member, a part of the resilient locating member extending into the central hole, at least one locating transverse slot being formed on the circumference of a middle section of the connecting end, whereby the part of the resilient locating member that extends into the central hole is inlaid in the locating transverse slot to locate the switch main body in the central opening of the layout fixing seat.

5. The assembling structure of the quick installation/uninstallation switch as claimed in claim 4, wherein the resilient locating member is U-shaped and has a first end and a second end, the first end being formed with a hook section, which is inlaid in a dent formed on the locating member adjacent to the circumference of the central hole, the second end of the resilient locating member being formed with a resilient arm extending into the central hole.

6. The assembling structure of the quick installation/uninstallation switch as claimed in claim 1 or 2, wherein the lateral projecting section of the locating member has a free end, an upper side of the free end being formed with a downward inclined guide slope, the lateral locating section having an end having a bottom side, the bottom side being formed with an upward inclined guide slope corresponding to the guide slope of the lateral projecting section, the guide slope of the lateral projecting section and the guide slope of the lateral locating section guiding each other and the resilient restoring member being cooperatively resiliently supported between the locating member and the layout fixing seat, whereby the lateral locating section can easily pass through the lateral projecting section.

7. The assembling structure of the quick installation/uninstallation switch as claimed in claim 1 or 2, wherein at least one end of the locating member that outward protrudes from the transverse insertion slot is formed with an insertion hole.

8. The assembling structure of the quick installation/uninstallation switch as claimed in claim 1 or 2, wherein at least one end of the locating member that outward protrudes from the transverse insertion slot is formed with laterally protruding stopper blocks, whereby two sides of an end of the transverse insertion slot can stop the stopper blocks.

9. The assembling structure of the quick installation/uninstallation switch as claimed in claim 1 or 2, wherein at least one lateral opening is formed beside the central opening of the layout fixing seat and at least one lateral hole is formed beside the central hole of the locating member in alignment with the lateral opening, the resilient restoring member being positioned in the lateral hole and the lateral opening.

10. The assembling structure of the quick installation/uninstallation switch as claimed in claim 1 or 2, wherein at least one inward protruding insertion section is formed on the circumference of the central hole of the locating member and at least one insertion dent is formed on the circumference of the connecting end of the switch main body corresponding to the protruding insertion section, whereby the protruding insertion section can be inserted into the insertion dent and located therein.

\* \* \* \* \*